Aug. 24, 1954 R. D. SLAYTON 2,687,451

SINGLE CHANNEL TELEGRAPH TRANSMITTING DISTRIBUTOR

Filed April 15, 1953 2 Sheets-Sheet 1

INVENTOR
RANSOM D. SLAYTON
BY Emery Robinson
ATTORNEY

Aug. 24, 1954 R. D. SLAYTON 2,687,451

SINGLE CHANNEL TELEGRAPH TRANSMITTING DISTRIBUTOR

Filed April 15, 1953

2 Sheets-Sheet 2

INVENTOR
RANSOM D. SLAYTON
BY Emery Robinson
ATTORNEY

Patented Aug. 24, 1954

2,687,451

UNITED STATES PATENT OFFICE 2,687,451

SINGLE CHANNEL TELEGRAPH TRANSMITTING DISTRIBUTOR

Ransom D. Slayton, Elmhurst, Ill., assignor to Teletype Corporation, Chicago, Ill., a corporation of Delaware Application April 15, 1953, Serial No. 348,851

7 Claims. (Cl. 178—17)

Figure 1:
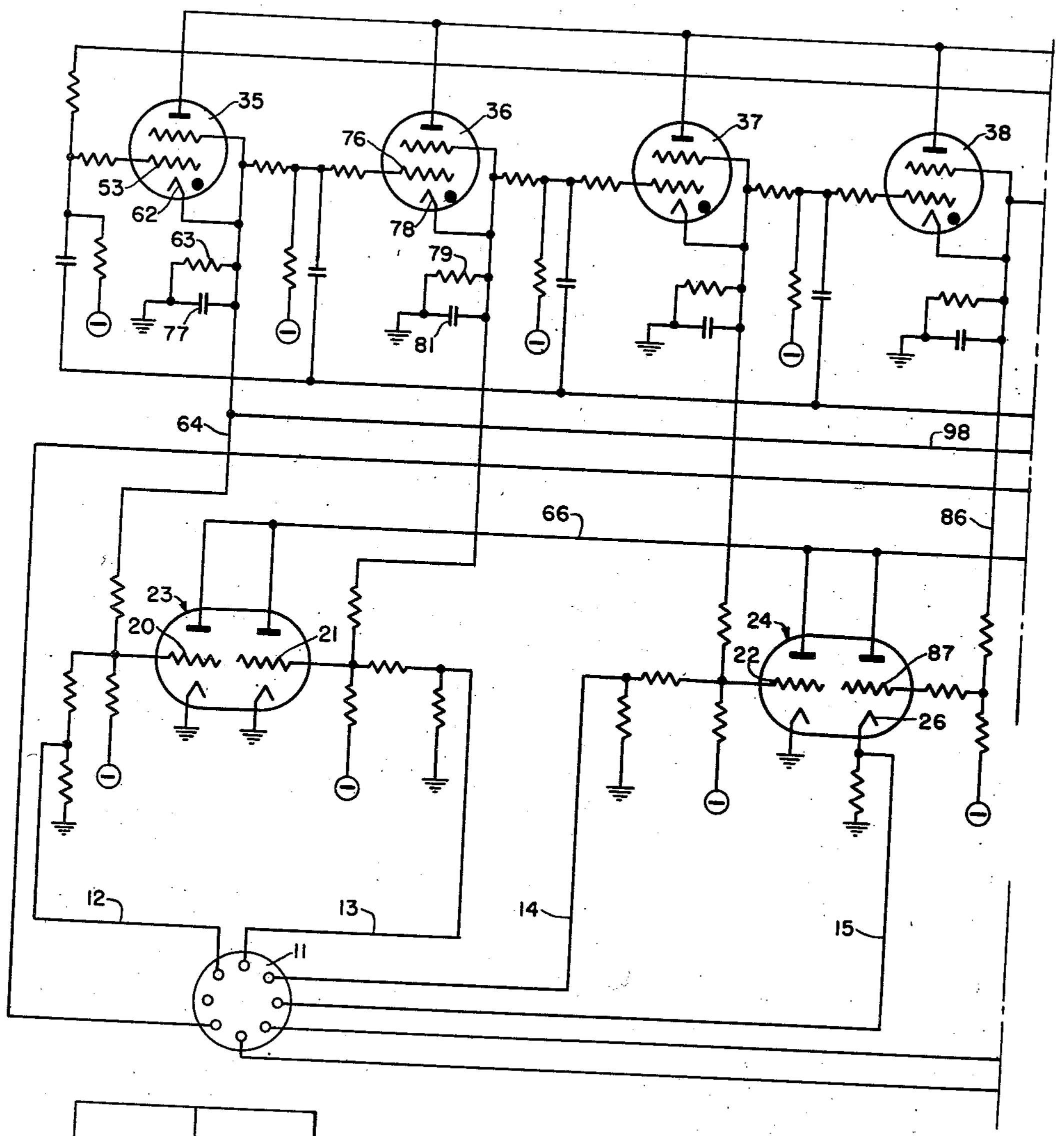

This invention relates to single channel telegraph systems and more particularly to a transmitting distributor for continuously impressing signals through a one channel synchronous transmission system.

Generally, when one channel transmission of signals is required, the type of signals used is the well known start-stop Baudot code signal. A decided advantage can be obtained by using a synchronous transmission system because the start-stop pulses associated with the Baudot code signals can be eliminated; hence the period of time that the signaling channel was occupied for the transmission of start-stop pulses can now be utilized for the transmission of the intelligence portion of a signal. It may be appreciated that if the signals devoid of start-stop pulses occupy the signaling channel during periods equal in duration to the periods formerly occupied by signals having start-stop pulses, then the intelligence pulses will be of longer duration; consequently, permitting the employment of circuits of poorer quality without sacrifice of reliability of reception.

A second advantage accruing to the synchronous transmission system is that synchronizing means of high stability may be used to provide greater continuity of service since circuit failures of instantaneous or up to several characters duration will only cause a momentary slight phase displacement of the distributing means, whereas a similar interruption with a start-stop system would not only cause the loss of intelligence during the signal failure, but also for a period thereafter until the mechanism had again located and become synchronized with the start and stop signal elements.

A primary object of the invention is to provide a transmitting distributor which is capable of continuously applying signals through a synchronous single channel transmitting system.

A further object of the invention is to provide an electronic transmitting distributor having an electronic tube for storing one element of a multi-element signal while a new multi-element signal is applied to condition the transmitter for subsequent operation.

Another object of the invention is the provision of a transmitting distributor having means for transmitting one element of a multi-element signal while a new multi-element signal is being applied to the unit, the operation thereat being such as to permit an instantaneous transition between the cessation of transmission of the first signal and the initiation of transmission of the second.

A still further object of the invention is to provide an electronic transmitter distributor which is adapted to continuously apply signals comprising only intelligence elements to a single signaling channel which may be of poorer quality.

With these and other objects in view the present invention contemplates a source of telegraph signals such as disclosed in the patent to R. D. Slayton, No. 2,582,218 dated January 15, 1952, wherein there is disclosed apparatus for converting a start-stop Baudot code signal into a signal having five intelligence impulses plus a control pulse. This patent is hereby incorporated by reference into the present disclosure. The present invention is concerned with the application of such signals to a series of mixer tubes in a transmitting distributor unit similar to that described in Patent No. 2,609,451 to T. A. Hansen, dated September 2, 1952, wherein a multi-channel telegraph system is disclosed. However, in the present invention the last intelligence impulse of a signal is not directly applied to a mixer tube from the converter unit described in the aforesaid Slayton patent, but rather is applied to a special storage tube to condition this tube for operation. Associated with the mixer tubes is a ring type distributor which cyclically operates to successively apply actuating impulses to each succeeding mixer tube to render said mixer tubes conducting if a proper conditioning potential due to the intelligence impulses has been previously applied. The mixer tubes are each adapted to control the operation of a transmitting unit associated with a single signaling channel.

The special storage tube is coupled to and controls the last mixer tube. The next to the last distributor impulse is applied to the storage tube to operate said tube in accordance with the last intelligence impulse received from the source of signals. The last distributor impulse operates the last mixer tube to control the operation of the terminal transmitting unit. This last distributor impulse is also applied to the source of signals to change the setting therein and effectuate the transfer of a new signal to condition the mixer tubes and the storage tube for a subsequent cycle of operation.

As a consequence of the operation of these circuits in the above-described manner, there is generated within the transmitting unit a six element telegraph signal wherein the successive character permutations succeed one another without pause, and wherein during idle periods an all "spacing" or "blank" signal permutation is transmitted for the precise duration of the character interval.

The present invention further contemplates that at the receiving terminal of the single channel synchronous telegraph system, corresponding signal detecting and converting devices will be provided similar to those described in the aforementioned patent to Hansen, and the patent to R. D. Slayton, No. 2,536,578, dated January 2, 1951. The invention further incorporates the use of very stable distributor driving and synchronizing means of the type disclosed in the aforesaid patent to T. A. Hansen.

Figure 3:
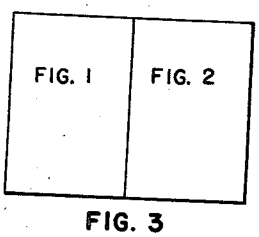
Figure 2:
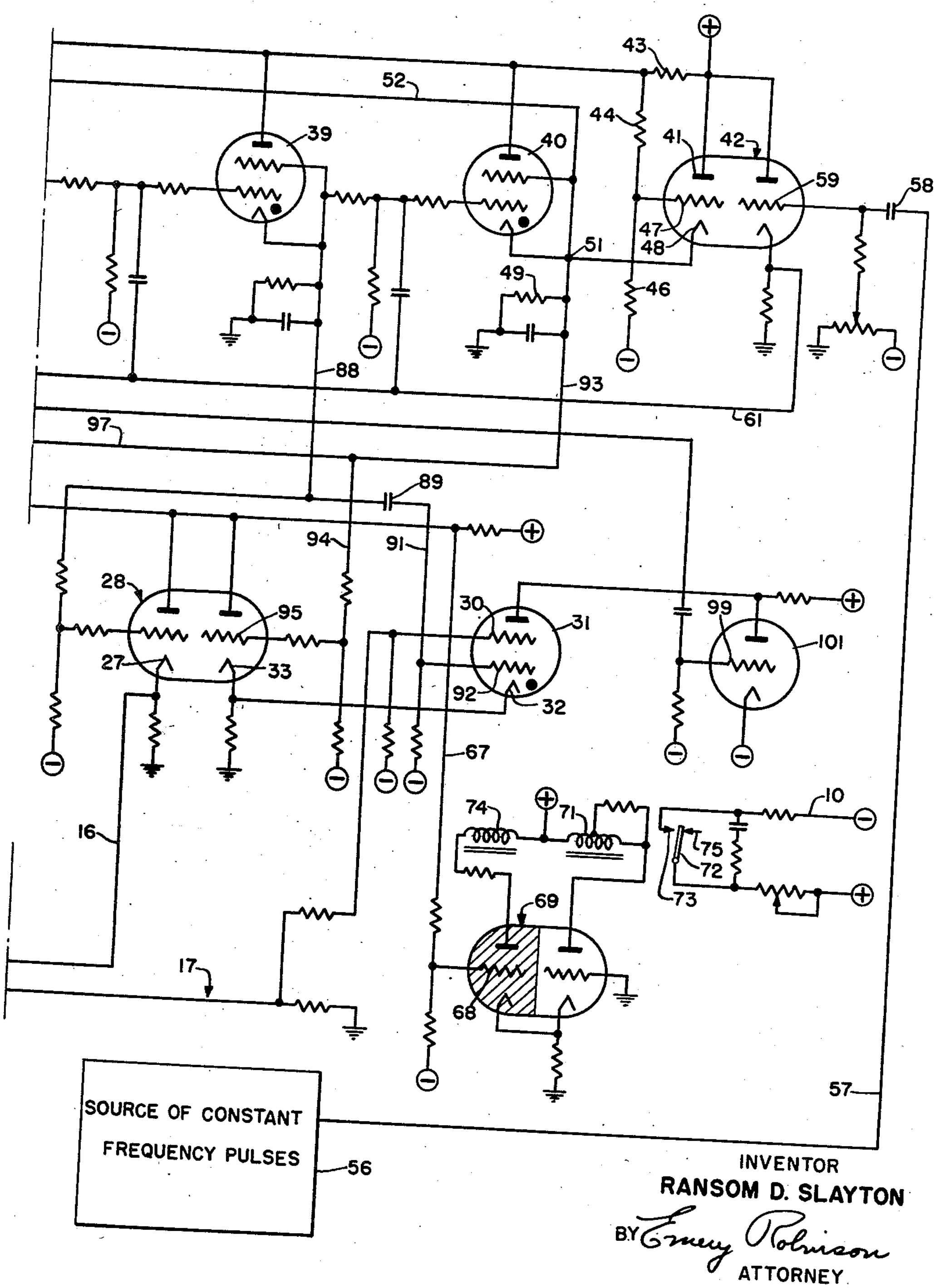

Other objects and advantages of the present invention will be apparent from the following detailed description when considered in conjunction with the accompanying drawings wherein:

Figs. 1 and 2 disclose a transmitting distributor for single signaling channel operation embodying the principal features of the invention; and Fig. 3 is a block diagram depicting the manner in which Figs. 1 and 2 are to be assembled.

When Figs. 1 and 2 are assembled in the manner indicated in Fig. 3 a complete unit is disclosed for applying signals from a source such as disclosed in the afore-identified Patent No. 2,582,218, to R. D. Slayton, to a single signaling channel denoted by the reference numeral 10. Referring to Fig. 1 there is disclosed a plug 11 adapted to be connected to the plug 77 shown in Fig. 4 of the Slayton patent. As described in this patent, start-stop Baudot code signals are converted into simultaneous signal potentials consisting of five intelligence impulses plus a control impulse. The intelligence impulse potentials impressed over the leads 107 in the Slayton patent and passing through the plug 77 also pass through plug 11 and are impressed over leads 12, 13, 14, 15, 16 and 17 of the instant disclosure. Potentials impressed over leads 12, 13, and 14 are impressed on the grids 20, 21 and 22 of mixer tubes 23 and 24, respectively. Potentials impressed on the leads 15 and 16 are applied to cathodes 26 and 27 found in the right-hand portion of the tube 24 and the left-hand portion of a mixer tube 28, respectively.

The potential impressed on the lead 17 is applied to a grid 30 of a gas filled tube 31 of the thyratron type. This tube possesses the characteristic that once it is rendered conductive or fired by the application of potential to its control grids, the grids no longer maintain control of the tube and the only way that said tube may be rendered nonconductive or quenched is to reduce its anode potential or raise its cathode potential. The tube 31 has a cathode 32 coupled to a cathode 33 of the right-hand portion of the tube 28. Both these cathodes 32 and 33 are connected through a common resistance to ground, hence the potential of one is impressed on the other.

Associated with the mixer tubes is an electronic distributor which comprises a plurality of gas filled tubes 35, 36, 37, 38, 39 and 40 similar in construction and operation to the tube 31. In Fig. 2 there is disclosed a double envelope tube 42, the left-hand triode of which forms a distributor start tube. Upon the application of power to the apparatus, positive battery is impressed on the anode 41 and positive battery is impressed through a common anode resistor 43 and a grid resistor 44 which together with a resistor 46 forms a voltage divider to apply potential to a grid 47 of the start triode of tube 42. The left-hand portion of the tube 42 is thereupon rendered conductive and its cathode 48 rises in potential due to the connection through a resistance 49 to ground. The rise in potential of the cathode 48 is impressed on a junction point 51 which is connected over a lead 52 to a grid 53 of the distributor tube 35. The appearance of positive potential on the grid 53 conditions the tube 35 for firing.

In Fig. 2 a square box 56 is used to represent a source of constant frequency impulses. This source can be controlled by crystal controlled oscillators to provide a steady output over a long period of time with unvarying frequency, as described in the afore-mentioned Hansen patent. The impulses are impressed over a lead 57, through a condenser 58 wherein the positive excursion of the impulse passed therethrough is impressed on a grid 59 of the right-hand portion of the tube 42. The right-hand portion of the tube acts as an amplifier and the appearance of this positive potential on the grid 59 renders this tube momentarily conducting. Upon the right-hand portion of the tube being rendered conducting, its cathode potential rises and the rise in potential is impressed over a lead 61 to the grid 53 of the distributor tube 35. It is to be recalled that the grid 53 was previously primed by the application of potential from the cathode 48 of the left-hand portion of the tube 42, consequently, the appearance of a rise in potential of the lead 61 and on the grid 53 causes the tube 35 to fire. Upon the tube 35 firing, its anode potential drops an amount equal to the voltage drop across the common anode resistance 43 which drop is impressed on the grid 41 to render the left-hand portion of the tube 42 nonconducting.

Upon the tube 35 being fired, its cathode 62 rises in potential due to the drop across a resistance 63 connected between ground and the cathode 62. The rise in cathode potential is impressed over a lead 64 to the grid 20 of the tube 23. In the situation where a marking condition is impressed over the lead 12, which is represented by an impression of positive potential, then the coincidence of the potentials being applied over the leads 12 and 64 is sufficient to raise the potential of the grid 20 to such a degree that the left-hand portion of the tube 23 is rendered conductive. Upon the left-hand portion of the tube 23 being rendered conductive, the anode potential thereof instantly drops and this drop in potential is impressed over a lead 66, over a lead 67, to a grid 68 of a triode forming the left-hand portion of a transmitting tube 69. With the application of potentials to the transmitting tube 69 in the manner indicated in Fig. 2, the tube is normally maintained in a conductive condition and hence upon the application of a drop in potential over the lead 67 to the grid 68, the left-hand portion of the tube is rendered nonconducting. When the left-hand portion of the transmitting tube 69 is rendered nonconductive, its cathode potential drops and this voltage drop is impressed on the cathode of the right-hand portion of the transmitting tube 69. Since the grid of the right-hand portion of the tube is grounded and positive battery is impressed on the anode, the right-hand portion of the tube is rendered conducting. Upon the right hand portion of the tube being rendered conductive, current passes through a coil 71 to set up a magnetic field which attracts an armature 72 to engage a fixed contact 73, thus completing the circuit of the signaling channel 10 to effectuate the transmission thereover of a current or marking pulse.

In the situation where there is no potential applied over the lead 12 which is indicative of a spacing potential, then the grid 20 is not primed and the appearance of a positive pulse over the lead 64 to the grid 20 is insufficient to render the left-hand portion of the tube conducting. In such a situation the potential impressed on the lead 66 is not changed, hence positive battery impressed over the lead 67 to the grid 68 maintains the left-hand portion of the transmitting tube 69 conductive. A conductive condition of the left-hand portion of the transmitting tube 69 completes a circuit through a coil 74 to set up a magnetic field which maintains the armature 72 against a back contact 75 in the manner indicated in Fig. 2. With the armature 72 engaging the back contact 75, a spacing or no current condition is impressed over the signaling channel 10.

Upon the next impulse being impressed over the lead 57 to the grid 59 of the right-hand portion of the tube 42, the tube 42 is again rendered conductive and its cathode potential again rises to impress an impulse over the lead 61 which impulse appears on the grids of all the distributor tubes 35 to 40, inclusive. A grid 76 of the tube 36 is coupled to the cathode 62 of the tube 35 and hence is maintained at a less negative potential as long as tube 35 is conducting due to the rise in potential of cathode 62. Upon appearance of an impulse over the lead 61 and on the grid 76 the conditioned tube 36 is fired. The anode potential of the tube 36 instantly drops and due to the fact that all the anodes of the other tubes 35 to 40, inclusive, are connected through the common anode resistance 43, the drop in potential on the anode of the tube 36 is impressed on the anode of the tube 35. Connected in parallel across the resistance 63 is a condenser 77 which opposes any change in the potential of the cathode 62 at the instant the anode potential of the tube 35 drops. A cathode 78 of tube 36 is connected through a cathode resistance 79 to ground. Connected in parallel across the resistance 79 is a capacitance or condenser 81 which likewise will oppose any rapid voltage change and consequently tends to hold the cathode 78 at ground potential. It may be thus appreciated that with the cathode 62 being held at a relatively high potential and the cathode 78 being held at a relatively low potential, sustaining of conduction of the tube 36 is favored and the quenching of the tube 35 is attained due to the insufficient potential between the anode of the tube 35 and its cathode 62. It is to be understood that the other tubes 37 to 40, inclusive, of the distributor are fired in a like manner upon the successive application of positive impulses over the lead 61.

Assume that the tubes 35, 36 and 37 have been fired in turn, and the signal code elements impressed on the grids 20, 21 and 22 have caused the transmission of signal pulses over the line 10. Then upon the next appearance of an impulse over the lead 61, the tube 38 is fired and its cathode potential rises to impress an impulse over a lead 86 to a grid 87 of the right-hand portion of the tube 24. If a positive potential is impressed from the source of signals over the lead 15 to the cathode 26, then the appearance of a positive potential on the grid 87 is insufficient to render the right-hand portion of the tube 24 conductive and consequently the left-hand portion of the transmitting tube 69 remains conductive to effectuate the transmission of a spacing signal over the signaling channel 10. When there is a spacing condition impressed on the lead 15 which is represented by an absence of potential, the cathode 26 is maintained in substantially ground potential and the appearance of the positive impulse on the grid 87 renders the right-hand portion of the tube conductive to cause the potential on the grid 68 to drop and manifestly render the left-hand portion of the transmitting tube 69 nonconductive. Upon the left-hand portion of the transmitting tube 69 becoming nonconductive the right-hand portion is rendered conductive; thus completing the circuit for the coil 71 to again draw the armature 72 against the contact 73 to impress a marking signal over the signaling channel 10.

The left-hand portion of the tube 28 functions in a manner identical to that described in relation to the right-hand portion of the tube 24. When the distributor tube 39 fires, a positive impulse is impressed over the lead 88 to control the left-hand portion of the tube 28 to determine the character of the signal impressed over the signaling channel 10. The positive impulse impressed on the lead 88 is also passed through a condenser 89 to provide a momentary positive impulse which is impressed over a lead 91 to a grid 92 of the gas filled tube 31. As previously described the grid 30 of the tube 31 is conditioned in accordance with the potential impressed upon the lead 17. Now if the signal source connected to the plug 11 is applying a marking or positive potential over the lead 17, then the appearance of a positive impulse on the grid 92 will fire the tube 31. Since the cathode 32 of the tube 31 is coupled directly to the cathode 33 of the right-hand portion of the tube 28, the right-hand portion of the tube 28 is conditioned in accordance with the signal condition impressed on the lead 17. Once the tube 31 fires, it will remain in a fired condition until its cathode potential is raised or its anode potential is dropped, consequently, the potential can be removed from the lead 17 following the firing of the tube 31. When the distributor tube 40 is fired in its regular position in the sequence of operation of the distributor, a positive impulse is impressed over a lead 93, over a lead 94, to a grid 95 in the right-hand portion of the tube 28. The appearance of a positive potential on the grid 95 is ineffective to render the right-hand portion of the tube nonconductive since the cathode potential is relatively high due to the firing of the tube 31; therefore, the left-hand portion of the transmitting tube 69 is not cut off and a spacing signal is impressed over the signaling line 10.

When a signal condition indicative of a spacing condition is impressed over the lead 17, then the appearance of a positive impulse on the grid 92 is insufficient to fire the tube 31. With the tube 31 in a quenched condition, the cathode 33 of the right-hand portion of the tube 28 is maintained substantially at ground potential and the appearance of a positive impulse over the lead 94 raises the potential of the grid 95 sufficiently to cause the right-hand portion of the tube to become conductive. The left-hand portion of the transmitting tube 69 is thereupon rendered nonconducting and as previously described the right-hand portion of the transmitting tube 69 is rendered conductive to cause the impression of a marking signal over the signaling channel 10.

It may be noted that the signal condition impressed on the leads 12, 13 and 14 from the signal source is transmitted as identical conditions over the signaling channel 10 whereas the signal conditions appearing on the leads 15, 16 and 17 are inverted when they are impressed on the signaling channel 10. The reason for this inversion is to provide a means for synchronizing the receiving equipment when idle signals are being transmitted through the system.

When the last distributor tube 40 fires, the positive impulse which is passed over the lead 93 is also impressed over a lead 97 through the plug 11 to the plug 77 (shown in the afore-identified Slayton patent) and more particularly a lead 78 emanating from the plug 77. As described in the Slayton patent the lead edge of the operating impulse clears the signal storage means and effectuates the transfer of a new signal to the signal storage means. The appearance of a new signal in the storage means is instantly impressed over the leads 12 to 17, inclusive, of the instant disclosure. The appearance of the new signal on the lead 17 is ineffective to control the tube 31 because once the tube is fired the grids lose control of the tube. Further the appearance of a new potential on the grid 30 at this time is ineffective to control the tube because it requires the appearance of positive potential on the grid 92 which can only occur when the tube 39 fires in the subsequent cycle.

When the tube 40 fires to complete the cycle of the distributor, the potential of the cathode is impressed through junction point 51, over the lead 52 to the grid 53 to again prime the tube 35. The next impulse applied to conductor 57 again renders the right-hand portion of the tube 42 conductive to apply a positive impulse over the lead 61 to the grid 53 to fire the tube 35, and thus a new cycle of the distributor is initiated. When the tube 35 is fired, the rise in potential on the cathode 62 is impressed over a lead 98, to a grid 99, of a vacuum tube 101 to render this tube momentarily conductive. Inasmuch as the cathode of the tube 101 is connected to negative battery the rendering of this tube conductive applies a slightly negative potential to the anode of the gas tube 31 to quench the gas tube and consequently condition it for operation during the subsequent cycle of operation of the distributor.

In summation it may be realized that the signal stored in the apparatus shown in the afore-identified Slayton patent is impressed on the control elements of the tubes 23, 24 and 28, and that these tubes are successively rendered conductive in accordance with said signal upon the successive application of distributor pulses by the successive firing of the distributor tubes 35 to 40, inclusive. The output of the tubes 23, 24 and 28 are successively applied to control the actuation of the transmitting tube 69 and in turn the condition assumed by the transmitting tube 69 controls the type of signal elements impressed over the signaling channel 10. The signal conditions impressed on the tubes 23 and 24, the left-hand portion of tube 28, and gas tube 31 are cleared upon the distributor tube 40 firing. A new signal is thereupon impressed on the tubes to condition them for a subsequent transmission of a new signal. This transfer and setting up of a new signal takes place while the right-hand portion of the tube 28 is controlling the transmission of a signal element over the signaling channel 10 in accordance with the signal stored in gas tube 31 and consequently upon its completion a new signal combination is controlling the mixer tubes. When the distributor tube 35 fires to initiate a new cycle of operation, an impulse is immediately impressed over the lead 98 to render the tube 101 conductive; therefore, the last impulse of the previous signal is cleared from the gas storage tube 31 to permit the gas tube to be primed in accordance with the last impulse of the new signal. In conclusion thereof it is to be noted that signal permutations are being continuously impressed over the signaling channel 10 without any gap between the signals so that maximum line time is being utilized.

It is to be understood that the above described arrangement of apparatus and selection of elemental circuits and tubes are simply illustrative of an application of the principles of the invention and many other modifications may be made without departing from the invention.

What is claimed is:

1. In an electronic transmitting-distributor for applying multi-element signals to a signaling channel, a series of mixer tubes, means for applying each element of a permutative signal to a separate tube, a distributor having a series of tubes connected in a ring and individually coupled to control the individual mixer tubes, means actuated by the last of said series of distributor tubes for removing the signal from the mixer tubes, and means for storing the last element of the signal when the multi-element signal is removed.

2. In an electronic transmitting distributor, a series of mixer tubes, a storage tube, means for applying priming potentials representative of all except the last element of a multi-element signal to all except the last of said mixer tubes, means for applying a potential representative of the last element of the multi-element signal to the storage tube, means for applying impulses to each succeeding mixer tube to successively operate said tubes in accordance with the character of the priming potentials applied thereto, means for applying one of said impulses to operate the storage tube, means coupling the storage tube to the last of said mixer tubes to condition said last mixer tube in accordance with the operation of the storage tube, and means connected to all said mixer tubes for generating intelligence signal elements in accordance with the permutation of mixer tubes operated.

3. In an electronic transmitting distributor for continuously applying multi-element signals to a single signaling channel, a series of mixer tubes, means for applying individual elements of a signal to individual mixer tubes, a ring type distributor for cyclically applying impulses to successive mixer tubes to render conductive those tubes having signal elements of a predetermined potential applied thereto, means actuated by the last of said impulses in a cycle for removing the signal elements from the mixer tubes, means for storing the last of said signal elements when said signal elements are removed, and means controlled by the first impulse of the next succeeding cycle of the distributor for removing the last of said signal elements.

4. In an electronic transmitting distributor, a series of mixer tubes, means for applying all except the last code element of a multi-element signal to the mixer tubes, a gaseous discharge tube, means for applying the last code element to the gaseous discharge tube to condition said tube, means connecting the gaseous discharge tube to the last mixer tube, an electronic ring type distributor for cyclically applying impulses to successive ones of the mixer tubes, means for applying the next to last impulse of a cycle of operation of the distributor to the gaseous discharge tube to operate the tube in accordance with the character of the last code element, means actuated by the last impulse of the cycle of operation of the distributor for removing the signal and applying a new signal to the mixer tubes, and means operated by the first impulse of the cycle of the distributor for quenching the gaseous discharge device.

5. In an apparatus for continuously transmitting multi-element permutation signals over a single signaling channel, a plurality of mixer tubes, a storage tube coupled to and adapted to control the last of said mixer tubes, means for applying all elements except the last element of a multi-element signal to said mixer tubes, means for applying said last element to the storage tube, a distributor having a plurality of tubes individually associated with each mixer tube, means for driving the distributor through successive cycles to successively apply impulses to each mixer tube, means for operating said storage tube by the next to the last of said distributor impulses to accordingly condition the last of said mixer tubes, a transmitting device connected to the signaling channel, means for successively controlling the operation of the transmitting device in accordance with the operation of the mixer tubes, and means for removing said multi-element signal during transmission of the last element of the multi-element signal.

6. In an apparatus for continuously transmitting signals comprising a plurality of intelligence impulses, a series of mixer tubes, a storage tube, means coupling the storage tube to the last of said mixer tubes, means for conditioning all except the last of said mixer tubes in accordance with all except the last element of the signal to be transmitted, means for conditioning the storage tube in accordance with the last element of said signal, a distributor for successively applying impulses to each successive mixer tube, a transmitting device adapted to be controlled by the successive operation of each mixer tube, the operation of each mixer tube being contigent upon the type of signal element impressed thereon and the impression of a distributor impulse, means for applying the next to the last distributor impulse to the storage tube to operate the storage tube in accordance with the signal element impressed thereon, and means for changing the signal impressed on the mixer tubes while the last of the signal elements is transmitted.

7. In an electronic transmitting distributor for accommodating multi-element signals having code elements which are of one of two different characteristics, a series of mixer tubes, a gaseous discharge tube having an anode, a cathode and a plurality of control grids, means for coupling the cathode of said gaseous discharge tube to control the last of said series of mixer tubes, means for applying all of the code elements except the last of a signal to the mixer tubes, means for applying the last code element to one of the grids of the gaseous discharge tubes, a ring type distributor having means for applying impulses to each individual mixer tube, means for cyclically driving the distributor to successively apply impulses to each successive mixer tube whereby each successive mixer tube is operated in accordance with the characteristic of the code element applied thereto, means for applying the next to last impulse of the distributor cycle to another control grid of the gaseous discharge tube to operate the tube in accordance with the character of the code element applied thereto, means operated by the last of said distributor impulses in a cycle for removing the signal and applying a new signal, a vacuum tube having its anode connected to the anode of the gaseous discharge tube, and means controlled by the first distributor impulse of the next subsequent cycle for rendering the vacuum tube conductive to quench the gaseous discharge tube.

References Cited in the file of this patent

UNITED STATES PATENTS

| Number | Name | Date |
|---|---|---|
| 2,117,804 | Hicks et al. | May 17, 1938 |
| 2,159,107 | Robinson | May 23, 1939 |